United States Patent [19]

Farlow

[11] 3,795,766

[45] Mar. 5, 1974

[54] MODE SELECTION AND CARRIAGE CLUTCHING ASSEMBLY FOR FACSIMILE

[75] Inventor: Jan M. Farlow, Fort Wayne, Ind.

[73] Assignee: Minnesota Mining and Manufacturing Company, St. Paul, Minn.

[22] Filed: Dec. 29, 1972

[21] Appl. No.: 319,340

[52] U.S. Cl. ........ 178/6.6 R, 178/7.6, 178/DIG. 27, 346/139 B

[51] Int. Cl. .............................................. H04n 1/14

[58] Field of Search ........... 178/6.6 R, 7.6, DIG. 27; 346/139 A, 139 B

[56] References Cited

UNITED STATES PATENTS 3,735,040 5/1973 Punt et al. .......................... 178/7.6

*Primary Examiner*—Raymond F. Cardillo, Jr.
*Attorney, Agent, or Firm*—Alexander, Sell, Steldt & DeLaHunt

[57] ABSTRACT

Mode selection and belt-clutching device for a carriage assembly for use in a drum-type facsimile machine. The drum is rotatably mounted in the facsimile machine and is adapted to receive and carry a sheet of paper wrapped around an outer surface of the drum. A carriage is mounted for movement along the drum parallel to the axis of rotation of the drum. A print transducer and a scan transducer are mounted on the carriage for printing or scanning the sheet. An endless belt is arranged to move parallel to the axis of rotation in order to transport the carriage. The facsimile device can operate in a send mode in which information on the sheet is transmitted to a remote location, a receive mode in which an image is produced on the sheet in accordance with information received from a remote location, and a neutral mode used during loading or unloading of the sheet when the drum remains stationary. These operating modes are determined by the position of a mode selection switch. A rotatable actuator plate mounted on the carriage bears two clutching pins that engage or disengage the belt and a third pin which simultaneously operates the mode selection switch so that the carriage is transported along the drum at appropriate times.

7 Claims, 6 Drawing Figures

PATENTED MAR 5 1974 3,795,766

MODE SELECTION AND CARRIAGE CLUTCHING ASSEMBLY FOR FACSIMILE

BACKGROUND OF THE INVENTION

This invention is related generally to a mode selection and clutching device for a carriage assembly in a drum-type facsimile apparatus. Such facsimile apparatus typically employs a sending transceiver that operates in a send mode to scan the contents of a document at a send location and to transmit signals representative of these contents to another like receiving transceiver in a receive location. The receiving transceiver operates in a receive mode to receive the transmitted signals representative of the contents of the document being scanned and to duplicate these contents on a sheet of paper. Both the sending and receiving transceivers typically employ a rotatable drum around which the sheet of paper or document is wrapped.

When the transceiver operates in the sending mode, the drum is rotated past a light detecting cell that is slowly moved parallel to the drum axis of rotation so that the entire document is scanned. When the tranasceiver operates in the receiving mode, the drum is rotated past a print transducer that is slowly moved parallel to the drum axis of rotation so that an image can be produced over the entire surface area of the sheet of paper. In a typical transceiver, the light detecting cell and print transducer are both mounted on a carriage that is engaged with a drive mechanism through a clutch so that the carriage moves parallel to the drum axis of rotation. While the sheet or document is being loaded or unloaded from the drum, the transceiver operates in a neutral mode of operation in which the drum, light detecting cell, and print transducer remain stationary. In this mode of operation the clutch disengages the carriage from the drive mechanism. Although various devices having been devised for selecting the operating mode of a transceiver and for engaging a carriage holding a light detecting cell and print transducer so that the carriage moves parallel to the drum axis of rotation, each has exhibited deficiencies that have limited its overall usefulness.

One known prior art device utilizes a lead screw to drive a carriage parallel to the axis of rotation of an associated drum. A half nut connected to the carriage is engaged with the lead screw in order to drive the carriage along the drum. In this device, the half nut clutching mechanism and mode selection functions are combined and operated by the rotation of a single selector knob. In all modes of operation except the receive mode, the selector knob also retracts the stylus of a print-out transducer mounted on the carriage by means of a lever and cam arrangement. This particular device requires the use of a spring-loaded rotary cam working in cooperation with actuating levers and rotary switches. Moreover, it requires spring-loaded ball detenting devices to maintain the selector knob in a given mode position. While this device is generally useful for the purpose intended, its construction and assembly are somewhat complex and expensive.

Accordingly, it is an object of the present invention to provide a simple and economical means for clutching and mode selection control in a facsimile device.

One other prior device utilizes a motor-driven belt to transport a carriage, but this device does not combine the functions of mode selection and clutching in a single operation.

Accordingly, it is another object to provide a means of simultaneous mode selection and clutching to an endless drive belt in a facsimile machine.

Still another object of this invention is to provide a compact carriage design to facilitate mounting of print and scan transducers and other components on the carriage.

SUMMARY OF THE INVENTION

The present invention is generally related to an improvement in a facsimile device of the type having a drum rotatable around an axis of rotation for carrying a sheet of material, such as paper, wrapped around an outer surface of the drum. A print transducer and a scan transducer are mounted on a carriage that is capable of moving parallel to the axis of rotation. The device includes an endless belt extending parallel to the axis of rotation adjacent the carriage and a drive unit for moving the belt.

The applicant has invented improved apparatus for simultaneously selecting the operating mode of the device and for clutching the carriage to the belt so that the carriage is moved along the drum parallel to the axis of rotation only during appropriate operating modes. According to a principal feature of the invention, the apparatus comprises a mode selector switch connected to the carriage and having a plurality of mode positions including first and second mode positions. A positioning device is engaged with the mode selector switch for locating and maintaining the switch in a desired one of the mode positions. A detent spring is mounted on the carriage and is adapted to cooperate with a clutch device. The clutch device holds the belt against the detent spring in at least one engaged position so that the carriage is moved by the belt. The clutch device also disengages the belt from the detent spring in a disengaged position so that the carriage remains stationary. An actuator connects the positioning and clutching devices so that mode selector switch is held in the first mode position as the clutch device is held in the engaged position and the mode selector switch is held in the second mode position as the clutch device is held in the disengaged position. By using this apparatus, a receive or send mode of operation can be switch selected while the carriage is simultaneoulsy clutched to engage the belt so that the carriage is moved across the sheet werapped around the drum. Likewise, a paper-loading mode of operation can be switch selected while the carriage is simultaneously disengaged from the belt. This unique arrangement eliminates any possibility that the carriage will not be properly driven during any mode of operation.

According to another feature of the invention, the actuator comprises a plate rotatably mounted on the carriage, and the clutch device comprises first and second pins connected to the plate and engageable with the detent spring, and a third pin connected to the plate and engageable with a fork-shaped member attached to the mode selector switch. By using this arrangement, the first and second pins hold the belt to the detent spring when the mode selector switch is moved to its send and receive mode positions, respectively, and the first and second pins disengage the belt from the detent spring when the mode selector switch is moved to its load or neutral mode position. By using this apparatus, the detent spring provides detenting or holding action for the mode selection switch, as well as the first and second pins.

BRIEF DESCRIPTION OF THE DRAWINGS

These and other objects, advantages and features of the invention will hereafter appear in connection with the accompanying drawings showing a presently preferred embodiment of the present invention wherein like numerals refer to like elements and wherein.

DESCRIPTION OF THE PREFERRED EMBODIMENT

Figure 1:
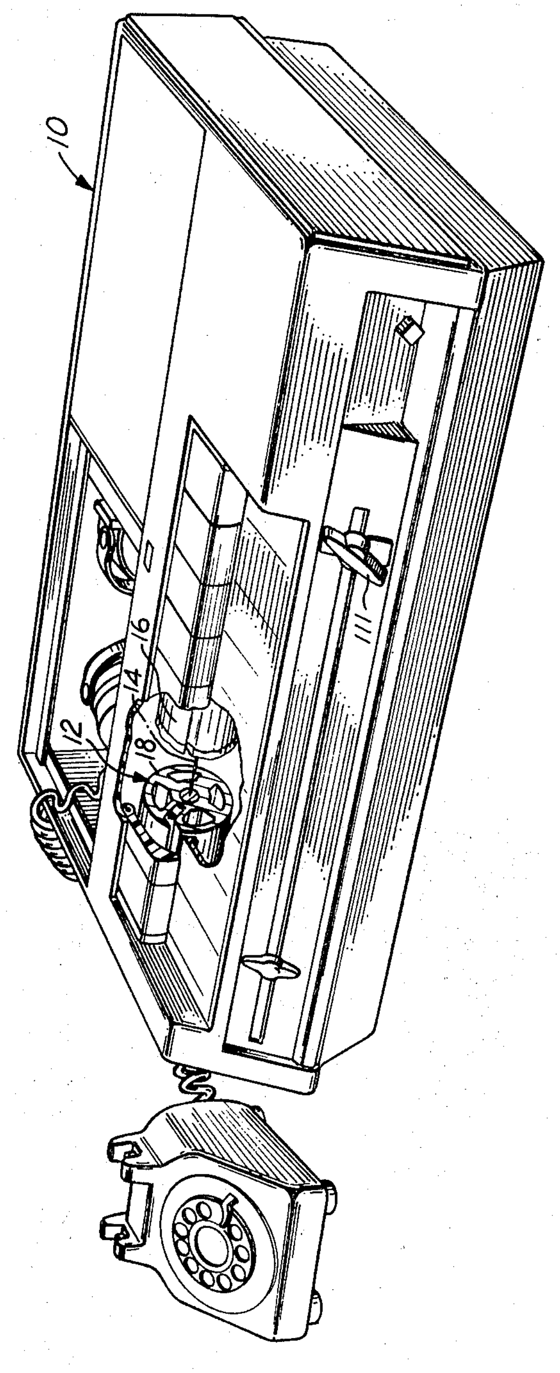
FIG. 1 is an isometric, partially broken away, view of a preferred form of facsimile device in which the present invention may be used.
Figure 2:
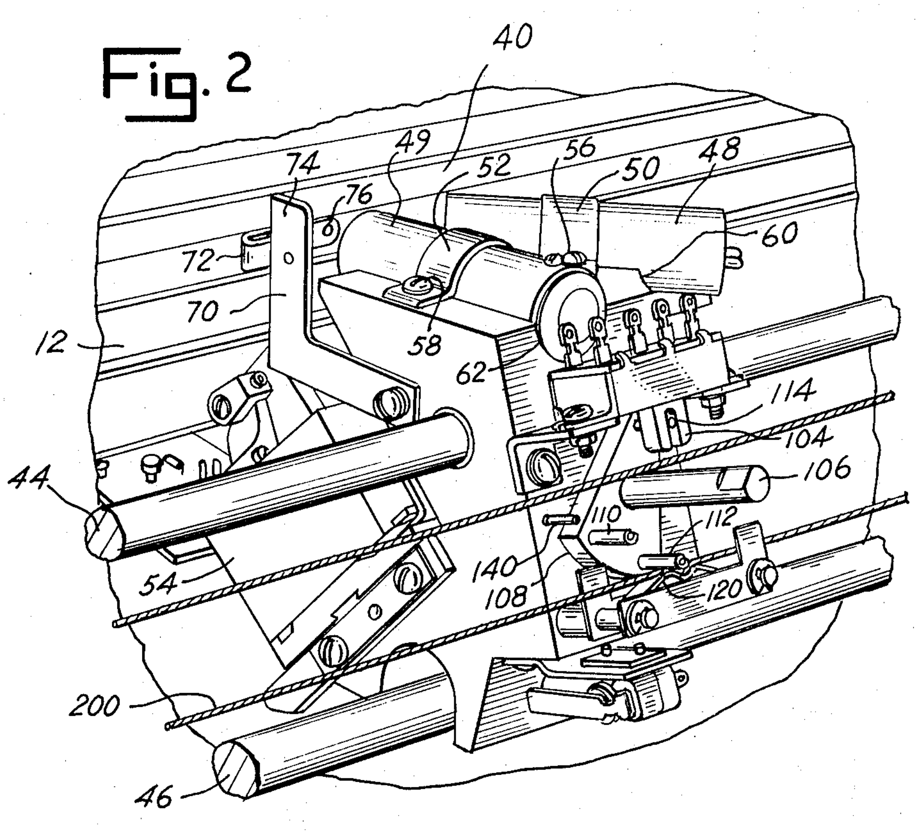
FIG. 2 is a left-hand isometric view of a preferred form of belt-clutching and mode-selection apparatus made in accordance with the present invention and shown in its receive mode position.

Referring to FIGS. 1 and 2, there is shown a facsimile device 10 having a drum 12 that rotates around an axis of rotation 14. A sheet of paper 16 is wrapped about an outer surface 18 of the drum 12 and it is rotated on the drum 12.

Facsimile device 10 is a transceiver which is capable of either scanning the contents of a document and transmitting signals representative of the contents of the document at a send location or of receiving signals representative of the contents of a document and printing out those contents on a paper at a receive location.

Figure 3:
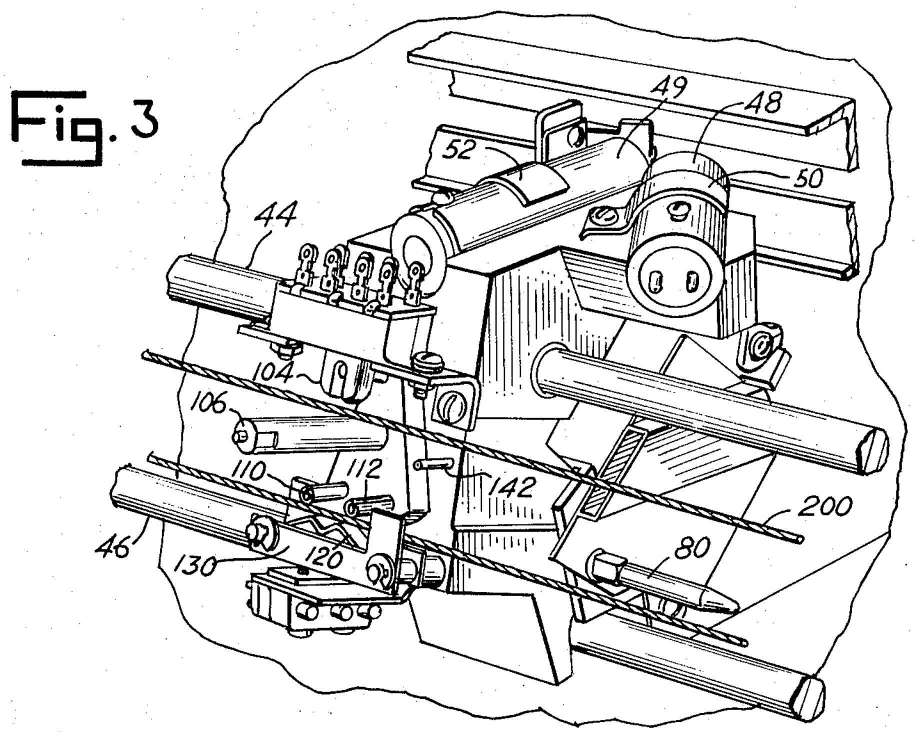
FIG. 3 is a right-hand isometric view of the apparatus shown in FIG. 2 in its load or neutral mode position.

Referring now to FIGS. 2 and 3, there is shown a carriage assembly 40. The carriage assembly 40 includes a carriage block 42 which is mounted for sliding movement parallel to the axis of rotation 14 of the drum 12. Block 42 is mounted for sliding movement on a first support shaft 44 and a second support shaft 46, as shown.

The carriage block 42 is adapted to receive both print and scan transducers. The scan transducer includes a lamp 48 and an optical sensor member 49. Lamp 48 is connected to the carriage block 42 by means of a spring clamp 50. The optical sensor 49 is similarly connected to block 42 by means of a second spring clamp 52. A pressure-type print-out transducer 54 is also connected to the carriage block 42.

The lamp 48 and optical sensor 49 are connected in such a manner as to be easily removed from the carriage block 42 by loosening fastening screws 56 and 58, respectively. After the fastening screws 56 and 58 are loosened, the cylindrically-shaped optical sensor transducer 49 and the cylindrically-shaped lamp 48 may be removed from the carriage block 42 by sliding them outwardly. The housing of the carriage block 42 is designed with half-cylinder channels 60 and 62 adapted to receive the lamp 48 and optical sensor transducer 49.

Also mounted on the carriage block 42 is a paper-sensing device 70 which is provided to sense the presence of paper on the drum 12. The paper-sensing switch includes a leaf spring 72, an insulated mounting plate 74 and a contact member 76 connected to the leaf spring 72. The leaf spring 72 is preloaded so as to maintain physical contact between the contact member 76 and the drum 12 which is constructed of electrically-conductive material. When paper is wrapped about the drum 12, conduction between contact member 76 and the drum 12 is terminated, thus signaling the presence of the paper. An electrical circuit may be used to transmit a low-level signal from contact 76 to the drum 12 which signal is interrupted by the presence of the paper when paper is loaded on the drum 12.

Referring to FIG. 3, a carriage position actuator 80 is connected to the carriage block 42 to actuate a switch (not shown) when the carriage block 42 moves into the extreme right-hand position at the end of carriage travel. By using the position alert actuator 80, travel of the carriage 40 may be terminated when the carriage has traversed the length of the drum 12.

Figure 4:
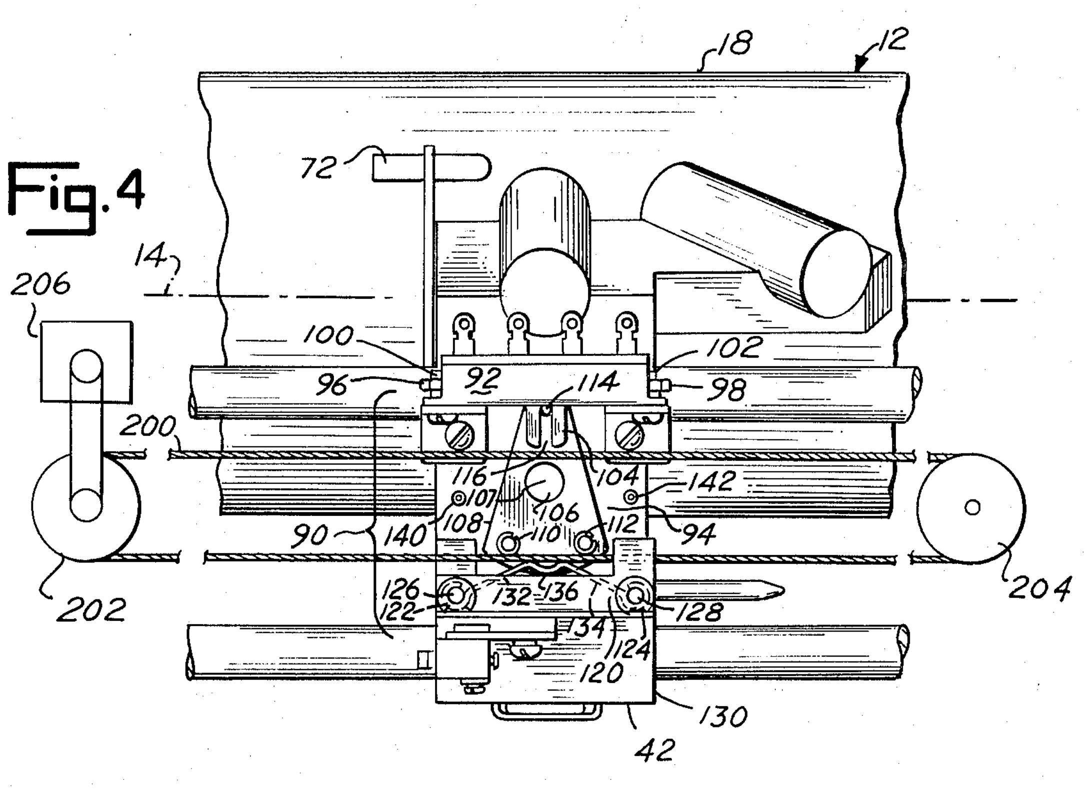
FIG. 4 is a fragmentary, broken, partially schematic, front elevational view of the apparatus shown in FIG. 2.

Referring to FIG. 4, an endless belt 200 is provided to transport the carriage 42. The belt 200 is mounted for belt rotation on pulleys 202 and 204. A drive motor 206 is operatively connected to pulley 202 and functions as a drive means for moving the belt 200 to transport the carriage 42.

Figure 5:
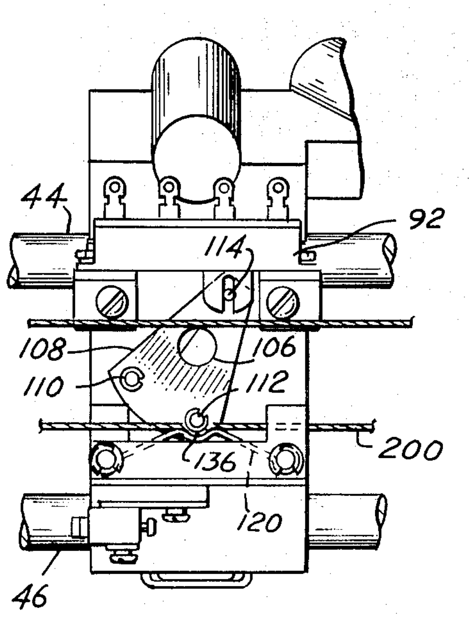
FIG. 5 is a fragmentary, front elevational view of a part of the apparatus shown in FIG. 4 in its receive mode position.
Figure 6:
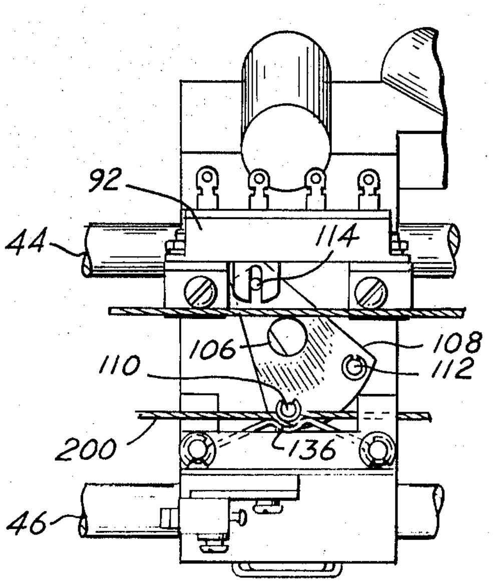
FIG. 6 is a fragmentary, front elevational view of the apparatus shown in FIG. 4 in its send mode position.

A mode selection belt clamping device 90 is connected to carriage block 42 and includes a slide switch 92 having three discrete mode positions shown in FIGS. 4-6. The switch 92 is connected to the carriage block 42 by means of bracket members 96 and 98 and screws 100 and 102. The switch 92 includes a fork-shaped switch member or button 104 which is movable into one of three discrete positions in a linear direction.

Device 90 also includes an actuator 94 having a shaft 106 rotatably connected to the carriage block 42. A plate 108 is connected to the shaft 106 for rotation around an axis of rotation 107. A knob 111 (shown in FIG. 1) is connected to the shaft 106 to rotate the shaft 106 and to move the carriage 42 along the drum 12, as will be more fully described. Connected to the plate 108 and extending outwardly therefrom are pins 110 and 112 which are spaced equidistant from the axis of rotation 107 of the shaft 106.

A third pin 114 is connected to the upper portion of the plate 108 as shown. The pin 114 is journaled in a slot 116 defined in the fork-shaped switch member 104. Pin 114 functions as a positioning means engaged with the mode selector switch 92 for locating and maintaining the switch 92 in a desired mode position. A detent spring 120 having curled ends 122 and 124 which are adapted to fit around detent spring securing posts 126 and 128, is also connected to the carriage. The curled ends of the detent spring may be inserted on the ends of the posts 126 and 128 and held securely therto by means of a bracket clamp 130 which may be placed over the posts 126 and 128. Lock washers may then be added to secure the bracket against the curled ends of the detent spring 120. The detent spring 120 includes spring arms 132 and 134 and a V-shaped detent member 136.

The detent spring 120 and the pins 110 and 112 are positioned so that one portion of the endless drive belt 200 runs therebetween. The first pin 110 is adapted to engage against the belt 200, riding into the V-shaped detent 136 of spring 120 to grip the belt 200 between the first pin 110 and the V-shaped detent 136 when the actuator 90 is rotated counter-clockwise into a first position. The second pin 112 is adapted to engage against and grip the belt 200 riding into the V-shaped detent 136 between the second pin 112 and the detent 136 when the actuator 94 is rotated clockwise into a second position. The first and second pins 110 and 112 are spaced apart from the detent spring 120 sufficiently so that they disengage from the belt 200 out of proximate contact with spring 120 when the actuator 94 is rotated into a third, neutral position. Stop members 140 and 142 are connected to the carriage block 42 and spaced apart from the actuator plate 108 so as to prevent rotation of the plate 108 beyond predetermined points.

In FIG. 4, the actuator 94 is in "neutral" mode where the belt 200 is allowed to travel freely between the pins 110 and 112 and the detent spring 120 without engaging therewith. The slide switch actuator member 104 is likewise in the neutral position and the knob 110 may be grasped to move the carriage to any desired position along the path of carriage travel without interference by the driven belt 200. Since facsimile device 10 is a transceiver, it has both a send and a receive mode. To place facsimile device 10 into the send mode, the knob 111 is rotated counter-clockwise to place the pin 114 on the slide switch 92 in the left-hand position. In this position (shown in FIG. 6), pin 110 engages to clutch and hold the belt 200 between the pin 110 and the V-shaped detent 136. To place facsimile device 10 in the receive mode, the knob 111 is rotated in a clockwise direction, past the neutral position, to place the actuator pin 114 of the slide switch 92 in the right-hand position. In this position (shown in FIG. 5), the pin 112 engages to clutch the belt 200 between the pin 112 and the V-shaped detent 136 of the spring 120.

In accordance with the foregoing invention, the mode selection and belt-clamping actuator 94 operates the slide switch 92 and simultaneously clutches the belt 200 in either the send or receive mode. In the neutral mode, the belt is allowed to travel freely without being clutched, and the mode selection switch 92 is placed in the neutral, (center) position. Means (not shown) are also provided responsive to the operation of the switch 92 to withdraw a pressure stylus in transducer 54 from contact with the drum 12 when the mode selection slide switch 92 is in the send or neutral position and to allow its contact with the drum 12 only when the switch 92 is in the receive position.

While in the foregoing there has been described a presently preferred embodiment of this invention, it is to be understood that other embodiments may be made to this invention without departing from the true spirit and scope of the invention.

What is claimed is:

1. In a facsimile device having a drum rotatable around an axis of rotation for carrying a sheet of material wrapped around an outer surface of the drum, a carriage mounted for movement parallel to the axis of rotation, a print transducer mounted on the carriage for producing an image on the sheet, a scan transducer mounted on the carriage for scanning the sheet, an endless belt extending parallel to the axis of rotation adjacent the carriage, and drive means for moving the belt to transport the carriage parallel to the axis of rotation, improved apparatus for mode selection and for clutching the carriage to the belt so that the carriage is moved along the drum comprising in combination:

a mode selector switch connected to said carriage and having at least first and second mode positions;

positioning means engaged with the mode selector switch for locating the switch in a desired one of the mode positions;

a detent spring mounted on the carriage;

clutch means for holding the belt against the detent spring in at least one engaged position so that the carriage is moved by the belt and for disengaging the belt from the detent spring in a disengaged position so that the carriage remains stationary; and actuator means for connecting the positioning means and clutching means so that the mode selector switch is maintained in the first mode position as the clutch means is maintained in at least one engaged position and so that the mode selector switch is maintained in the second mode position as the clutch means is maintained in the disengaged position.

2. The improvement, as set forth in claim 1, wherein said actuator means comprises a shaft rotatably connected to the carriage, a plate connected to the shaft for rotation with the shaft relative to the carriage, said plate having a first side and a second side and a knob connected to the shaft for rotating the shaft and for moving said carriage parallel to the axis of rotation.

3. The improvement, as set forth in claim 2, and further comprising a first stop member connected to the carriage adjacent the first side of the plate to stop the plate from rotating beyond a predetermined position, and a second stop member connected to the carriage adjacent the second side of the plate to stop the plate from rotating beyond a second predetermined position.

4. The improvement, as set forth in claim 1, wherein the actuator means comprises a plate mounted on the carriage for rotation around a second axis of rotation and wherein the clutch means comprises a first pin and a second pin connected to the plate and extending outwardly therefrom, said first pin being adapted to hold the belt against the detent spring when the plate is rotated to a first engaged position, said second pin being adapted to hold the belt against the detent spring when the plate is rotated to a second engaged position, and said first and second pins being adapted to disengage the belt from the detent spring when said plate is rotated into the disengaged position.

5. The improvement, as set forth in claim 4, wherein the detent spring comprises a V-shaped portion adapted to comate with the first and second pins.

6. The improvement, as set forth in claim 4, wherein said mode selector switch comprises a slide switch.

7. The improvement, as set forth in claim 6, wherein the slide switch comprises a fork-shaped switch member having a slot therein and wherein the positioning means comprises a third pin connected to the plate and located within the slot.

* * * * *